US00RE34392E

United States Patent [19]

Benoit

[11] E Patent Number: Re. 34,392

[45] Reissued Date of Patent: Sep. 28, 1993

[54] DISPENSING SYSTEM FOR SEVERABLE SHEET MATERIAL

[75] Inventor: Gordon L. Benoit, Victor, N.Y.

[73] Assignee: Mobil Oil Corporation, Fairfax, Va.

[21] Appl. No.: 733,044

[22] Filed: Jul. 19, 1991

Related U.S. Patent Documents

Reissue of:

[64] Patent No.: 4,979,617
Issued: Dec. 25, 1990
Appl. No.: 351,756
Filed: May 15, 1989

U.S. Applications:

[63] Continuation-in-part of Ser. No. 687,697, Dec. 31, 1984, abandoned.

[30] Foreign Application Priority Data

Dec. 30, 1985 [CA] Canada ..... 498711

[51] Int. Cl.[5] ..... B65D 85/67

[52] U.S. Cl. ..... 206/390; 206/554; 221/46; 225/1; 225/46

[58] Field of Search ..... 206/390, 554; 221/46, 221/63; 225/47, 52, 53, 77, 106, 1, 46

[56] References Cited

U.S. PATENT DOCUMENTS

| | | | |
|---|---|---|---|
| 441,669 | 12/1890 | Jones | 225/38 |
| 444,106 | 1/1891 | Spraker . | |
| 619,188 | 2/1899 | Kirkwood . | |
| 819,678 | 5/1906 | Simmons . | |
| 1,087,978 | 2/1914 | Power . | |
| 1,967,422 | 7/1934 | Nadelson | 45/68.3 |
| 2,082,490 | 10/1936 | Goldsmith | 206/51 |
| 2,771,214 | 11/1956 | Lefebvre | 206/390 |
| 2,858,088 | 10/1958 | Bookout | 242/128 |
| 2,864,495 | 12/1958 | Ritchie | 206/58 |
| 3,298,580 | 1/1967 | Lerner | 225/106 |
| 3,523,653 | 8/1970 | Hansen | 242/55.53 |
| 3,718,251 | 2/1973 | Barnett | 206/47 |
| 3,754,370 | 8/1973 | Hanson | 53/29 |
| 3,771,700 | 11/1973 | Garr | 225/39 |
| 4,002,264 | 1/1977 | Marchesani | 221/63 |
| 4,088,275 | 5/1978 | Ramos | 242/55.3 |
| 4,171,047 | 10/1979 | Doyle et al. | 206/210 |
| 4,180,160 | 12/1979 | Ogawa et al. | 206/210 |
| 4,262,816 | 4/1981 | Margulies | 221/46 |
| 4,274,573 | 6/1981 | Finkelstein | 225/186 |
| 4,289,262 | 9/1981 | Finkelstein | 225/106 |
| 4,349,123 | 9/1982 | Yang | 220/407 |
| 4,364,490 | 12/1982 | Lang et al. | 220/407 |
| 4,583,642 | 4/1986 | Blythe et al. | 206/390 |
| 4,607,774 | 8/1986 | Garr | 225/47 |
| 4,793,539 | 12/1988 | Haenni et al. | 225/106 |
| 4,930,385 | 6/1990 | Wilfong, Jr. et al. | 225/106 |

FOREIGN PATENT DOCUMENTS 1325923 8/1973 United Kingdom .

*Primary Examiner*—Jimmy G. Foster
*Attorney, Agent, or Firm*—A. J. McKillop; G. W. Hager; J. P. O'Sullivan, Sr.

[57] ABSTRACT

A dispensing system for a package of a continuous, severable sheet material comprising a number of individual severable members, such as plastic bags, separated by transverse pre-weakened regions, such as perforations, is composed of a storage container holding the package and a dispensing device. The dispensing device is separate from and is located at a location remote from the storage container. The continuous severable sheet material is conducted to the dispensing deice and is threaded therethrough until the pre-weakened separating two consecutive members emerges through the exit of the device. A sufficient force is then applied to the continuous, severable sheet material to separate the two consecutive members from each other at the pre-weakened regions.

30 Claims, 3 Drawing Sheets

FIG. 1
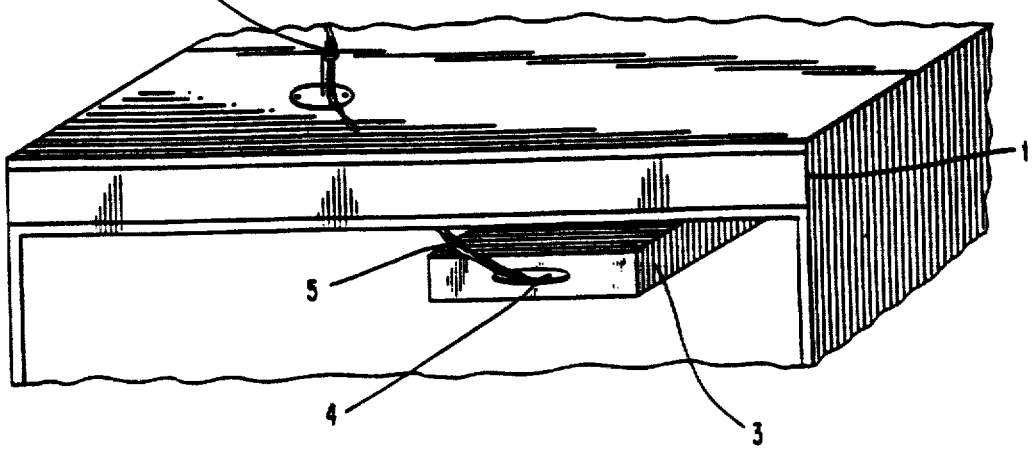
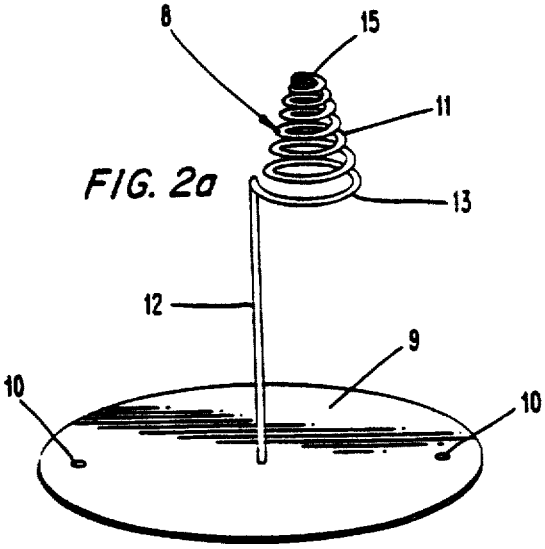
FIG. 2a
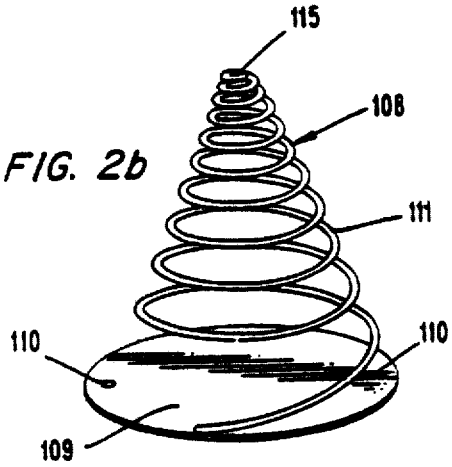
FIG. 2b
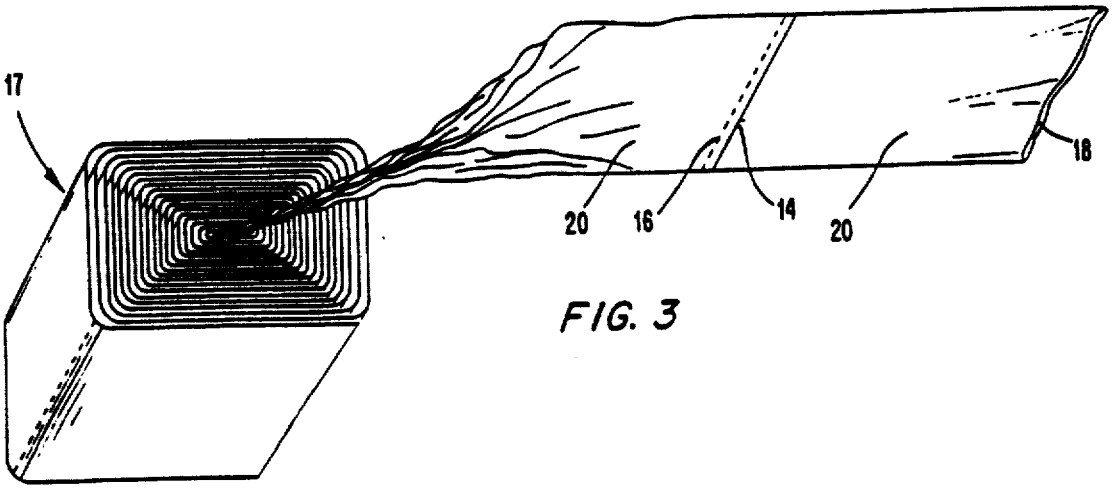
FIG. 3

DISPENSING SYSTEM FOR SEVERABLE SHEET MATERIAL

Matter enclosed in heavy brackets [ ] appears in the original patent but forms no part of this reissue specification; matter printed in italics indicates the additions made by reissue.

[This is a continuation-in-part (CIP) of application Ser. No. 687,697, filed on Dec. 31, 1984, now abandoned the entire contents of which are incorporated herein by reference.]

*This is a reissue application of U.S. Pat. No. 4,979,617, issued Dec. 25, 1990 from application Ser. No. 351,756, filed May 15, 1989 as a continuation-in-part of abandoned application Ser. No. 687,697, filed Dec. 31, 1984.*

BACKGROUND OF THE INVENTION

1. Field of the Invention

This invention relates to an improved dispensing system for a package of a continuous, severable sheet material comprising a number of individual members severable from each other.

2. Discussion of Related Art

Dispensers for rolled-up materials, such as paper articles and plastic bags, are known in the art. These dispensers suffer from certain drawbacks, also well recognized in the art. For example, the dispensers are normally employed to dispense a material which requires an expensive device to assist in the separation of the rolled-up material from the roll, or which requires the employment of the user's two hands to sever the rolled-up material from the roll. Thus, Finkelstein, U.S. Pat. No. 4,274,573, discloses a dispenser for a rolled-up material, wherein the dispenser wall or walls adjacent to the circumference of the roll of the material inside the dispenser are provided with a first aperture through which the material, unwindable from the outside of the cylindrical wall, can be withdrawn from the dispenser. The dispenser also contains a second aperture in the wall adjacent to an end face of the wound-up roll through which the material unwindable from the inside of the roll can be drawn from the dispenser.

Barnett, U.S. Pat. No. 3,718,251, discloses a container for rolled goods, such as plastic bags, wherein the bags are removed from the roll through an opening in the container. The bags are removed by unwinding them from the outside of the roll.

Ritchie, U.S. Pat. No. 2,864,495, discloses a paper product roll dispenser comprising a container containing in one end wall portion thereof a centrally located removable portion defining an access to the container. A roll of paper product material, such as facial tissue, hand towels or toilet tissue, comprising a continuous roll of a plurality of severable sheets of the material disposed within the container is positioned within the container in such a manner that the end portion of the roll is adjacent to the access portion of the container. The individual sheets of the paper product are dispensed from the container by pulling the most innermost sheet of the paper product from the inside of the roll through the access portion of the container.

Doyle et al., U.S. Pat. No. 4,171,047, similarly to Ritchie, also disclose a container for removing from one end thereof, containing an opening, a longitudinally folded pre-moistened web of material comprised of a number of severable members, such as premoistened towelettes.

Hansen, U.S. Pat. No. 3,523,653, also discloses a container enabling the removal of individual members from a continuous roll of severable members through an opening in the middle of the container in such a way that the individual members are removed from the end of the rolled-up roll of the members.

Ellison, British Patent Specification No. 1,325,923, discloses a device for dispensing thin, flexible plastic film articles detachably joined in a series as a continuous stoved length. The articles are, e.g., plastic bags, and they are dispensed by unwinding a roll of the articles from the outside of the roll, flattening a continuous length of the particles and passing them over a series of rollers to a downstream surface delivery means.

In most of the patents and publications discussed above the functions of a holding container and a dispensing unit were combined within a single package. However, in some practical application, it is desirable to separate the two functions from each other. For example, in food supermarkets, certain plastic bags, commonly referred to in the trade as "wet bags" or "food bags", are used to contain products which, because of refrigeration or freezing, produce condensate moisture on the exterior thereof. Such products are inserted into the wet bags prior to the deposition thereof into a grocery sack to prevent direct contact of the potentially wet surface of the product with other products it the grocery sack. Normally, a roll of such bags is stored in a location under the counter of the checkout station, or behind the check-out station, and the check-out clerk must repetitiously bend to reach for and remove each bag from the container holding it under the counter. Such a repetitious bending motion is tiring, cumbersome and inconvenient.

Accordingly, it is a primary object of the present invention to separate the function of the storage of a continuous roll of severable individual members from the function of dispensing such severable members from each other at a remote location.

Additional objects of the invention will become apparent to those skilled in the art from the following description and the appended claims.

SUMMARY OF THE INVENTION

There is provided a dispensing system for a package of a continuous, severable sheet material comprised of a plurality of individual severable members. Each of the members is defined by tranverse pre-weakened regions. The dispensing system comprises a storage container means holding the package and a dispensing means which is located separately from and at a location remote from the storage container means. The dispensing means is capable of guiding the severable sheet material therethrough, and, when sufficient force is applied to any one of the severable members, the dispensing means provides a sufficient resistance to such a force to insure that the member upon which the force is exerted is separated from the consecutive member in the area of the pre-weakened region.

BRIEF DESCRIPTION OF THE DRAWINGS

FIG. 1 is a schematic representation of the dispensing system of the present invention.

FIG. 2A is an illustration of one embodiment of the dispensing means of the present invention.

FIG. 2B is an illustration of an alternative embodiment of the dispensing means of the present invention.

FIG. 3 is an illustration of a coreless package of thermoplastic film wet bags which can be used with the dispensing system of the present invention.

DETAILED DESCRIPTION OF THE INVENTION

Figure 4:
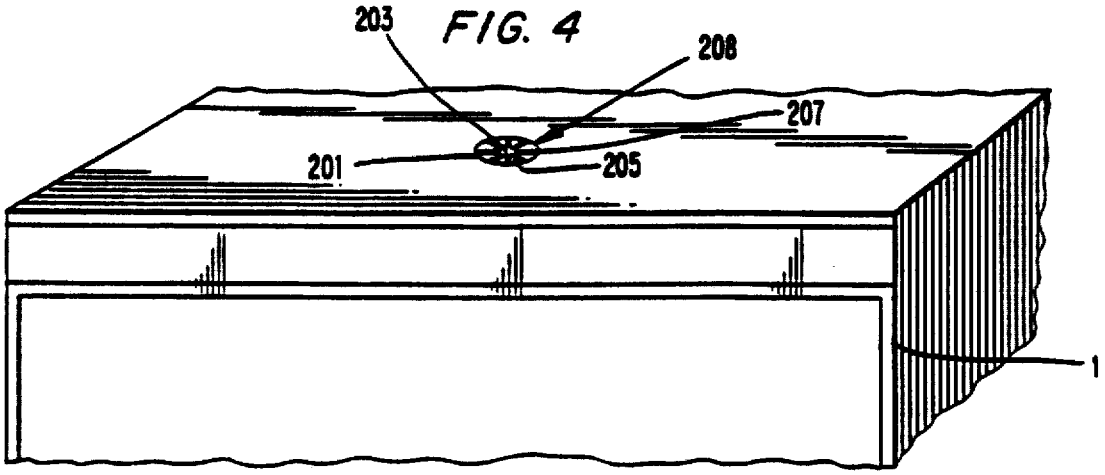
FIGS. 4 and 5a–5h illustrate alternative embodiments of the invention.
Figure 5A:
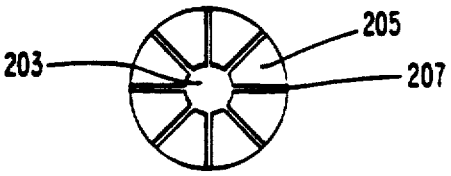
Figure 5C:
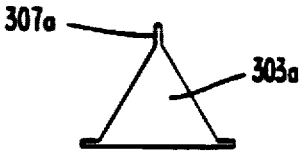
Figure 5B:
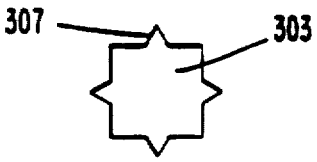
Figure 5D:
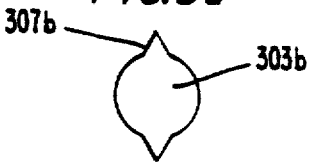
Figure 5F:
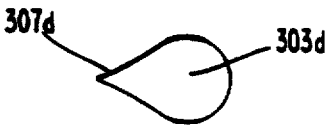
Figure 5E:
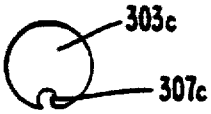
Figure 5G:
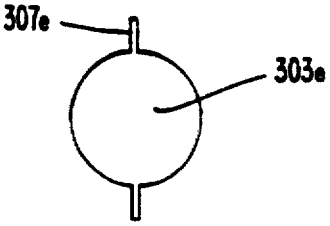
Figure 5H:
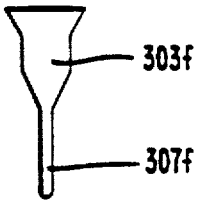

The package of a continuous severable sheet material used with the dispensing system of the invention is any package comprised of any individually severable members, with each of the members being defined by transverse pre-weakened regions and separated from each other by such regions, such as a roll of plastic gussetted or ungussetted bags, of any gauge or size, such as waste bags, trash bags, garbage bags and sandwich type bags. The system can also be used for storing and dispensing articles other than plastic bags, such as wax paper or toweling. In a preferred embodiment of the invention, the dispensing system is used to store and dispense any article contained on a coreless self-supporting roll of a plurality of individual severable members, the roll being usually formed by winding a plurality of individual severable members onto a roll supported by a central support member, and removing the roll from the support member, thereby collapsing it along the axis of the previously-present support member. The thus-obtained roll need not have a circular cross-section, but can, and usually does, assume the shape of an oval or ellipse in cross-section. The individual, severable members are then unwound from the center of the collapsed roll.

In the most preferred embodiment, the system of the present invention is utilized for holding and dispensing gussetted food bags from such a coreless roll containing a number of individual severable food bag members, which unwind from the center of the coreless roll.

The storage container may have any shape suitable for holding a coreless self-supporting wound roll of severable sheet material. The container can be made of any suitable material, such as cardboard, corrugated paper, metal, heavy gauge plastic or film. The container contains at least one opening in at least one of the walls thereof to allow the continuous severable sheet material to be removed therefrom. The opening may be of any suitable shape, such as a circular hole, an oval, a triangle, a rectangle, an elongated rectangle or a square. The opening can be of any size which allows the continuous, severable sheet material stored within the container to be removed therethrough without an undue amount of resistance which might sever the bags.

The dispensing means can also be made of any suitable construction material sufficiently rigid to guide the continuous, severable sheet material therethrough and to provide a sufficient resistance to a force exerted onto the sheet material when it is desired to separate the consecutive articles from each other. The dispensing means must be constructed of a material having a sufficient rigidity to facilitate the separation and retain the article adjacent to that being separated with the dispensing means. Suitable construction materials for the dispensing means are metal, e.g., aluminum, steel or copper, wire rod having a diameter of about 1/16 to about ¼ inches, plastic, wood or plywood. The dispensing means member may have any shape suitable for performing its function, such as a cone, a spiral, or a multiplicity of clustered slots extending radially from a common center of a sheet of any flexible material, e.g., polyurethane having a thickness of about ⅛ inches.

The sheet material is guided from the storage container to the dispensing means directly or through at least one conventional guiding means, such as an eyelet, guiding the material from the storage container to the dispensing means. When the sheet material is guided, it need not have a "lay-flat" configuration, i.e., a uniform, flat profile. In the preferred embodiment using a coreless, center unwind, self-supporting roll of individual, severable members, such as food bags, the sheet material develops a twist as it is dispensed from the roll and is guided from the storage container to the dispensing means.

The invention will now be described in connection with one exemplary embodiment thereof illustrated in FIGS. 1, 2, 3, 4 and 5a–5h. It will be apparent to those skilled in the art, however, that the invention is not limited to these particular embodiments.

With reference to FIG. 1, a storage container 3 holding a package of gussetted food bags is located under the countertop of a supermarket checkout counter 1. The container 3 has an opening 4 located in the side thereof through which the wet bags, in the form of a continuous sheet of a material separated by perforations, are removed and passed to a remotely-located dispensing unit 8. The unit 8 is fabricated from a mild steel rod having a diameter of about 1/16 inches. The base member 9 of the unit 8 (FIG. 2A) has two or more openings 10 for attaching the dispensing unit to the countertop. A stem 12 is attached substantially perpendicularly to the base 9 and it ends with a spirally-wound wire 11 containing a bottom wider portion 13 and a top, relatively narrow portion 15. The base of the unit 9 is securely attached, for example by nails or screws, through the openings 10 to the top of the countertop.

In one embodiment of the dispensing means of FIG. 2a, the height of the entire dispensing device 8 is about 4 inches, the base 9 is circular in shape and has a diameter of about 4½ inches, the bottom 13 of the spirally-wound element 11 has a diameter of about 1 inch and the top 15 thereof has the diameter of about ½ inch.

In practicing this particular embodiment of the invention, the food bags, in the form of a continuous sheet of the bags separated by perforations, are removed from the container 3 and conducted through a suitable opening in the countertop 1 (not shown in the drawings) to the remotely-located dispensing unit 8. The continuous sheet of the bags is then threaded into the bottom 13 of the spiral 11 so that the top of the first bag emerges through the relatively narrow opening 15 of the spiral 11. To remove individual bags, the first bag is pulled through the spiral 11 unitl the perforation separating it from the adjacent bag emerges from the top 15 of the spiral 11. The first bag is then pulled in an angular direction or perpendicularly to the axis of the spiral 11 to separate it at the line of perforation from the next bag. This sequence is then repeated for each individual food bag.

FIG. 2b illustrates one alternative embodiment of the dispensing means 108 which can be used with the present invention, the dispensing means comprising a cone shaped from a spirally-wound wire having a diameter of about ⅛ to about ¼ inches. The dispensing means 108 comprises a base member 109, circular in shape, and a dispensing cone-shaped member 111, formed from the same wire as the dispensing means. The base member 109 contains two or more openings 110 for fasteners. The operation of the dispensing system with the dispensing means 108 is substantially similar to that with the dispensing means 8 of FIG. 2a, as will be obvious to those skilled in the art. When the dispensing means 108 is used, the continuous sheet of the severable members may be threaded into the unit 108 either through the bottom 109 or in-between any of the two consecutive spirally-wound wire members forming the cone. The sheet is then threaded through the cone, withdrawn from it through the top 115, and the operation of the system is conducted in the manner identical to that with the dispensing means 8 of FIG. 2a.

The base of the dispensing unit, such as the base 9 or 109, is usually circular in shape, 1 to 3 inches in diameter. The stem, or support member of the dispensing unit, such as the member 12, is usually about 2 to 6 inches in length. The total height of the dispensing unit is usually 2½ to 5½ inches.

FIG. 3 illustrates an example of a package of food bags which can be used with the dispensing system of the invention. A coreless, center unwind roll 17 comprises a number of thermoplastic film bags 20, with each bag having a bottom seal 14 and adjacent thereto a line of perforations 16 through the bag layers which will constitute the bag mouth opening 18 upon severence of one bag from the adjacent bag at the line of perforations 16. Such a bag and a container therefore are described in detail in a copending Canadian Patent Application, Ser. No. 476,493, filed on Mar. 14, 1985.

FIGS. 4 and 5 illustrate another alternative embodiment of the dispensing means 108, designated in FIG. 4 with the numeral 208. The dispensing means 208 comprises a multitude, e.g., six or eight, of sections 205 (FIG. 5a) formed by longitudinal cuts 207 in a sheet of a suitable material, e.g., polyurethane having a thickness of about ⅛ inches. A central circular opening 203 is formed for guiding the continuous severable sheet material therethrough. The entire dispensing means is mounted into the supermarket check-out counter 1, and it may be indented with respect to the horizontal surface of the counter, even therewith, or elevated above the surface. In operation, the continuous sheet of severable material, e.g., of food bags, is threaded from the bottom of the counter into the unit 208 through the opening 203 and withdrawn from the top of the unit. If the dispensing unit is used to dispense food bags, the first bag is pulled through the opening 203 until the perforation separating it from the adjacent bag emerges from the top of the dispensing unit. The first bag is then pulled in an angular direction or perpendicularly to the surface of the counter so that the next adjacent bag becomes engaged by one of the cuts 207 which maintains it in position while the first bag is separated from it. This sequence is then repeated for each individual food bag. FIG. 5a is a top view of the dispensing means 208.

FIGS. 5b–5h illustrate seven alternative examples of the configurations which can be used instead of the multi-section dispensing means 208. In each of these configurations, each of the dispensing means 308, corresponding functionally to the means 208 of FIG. 4, has a comparatively broad region 303, 303a–303f and at least one relatively narrow region or cut 307, 307a–307f. The broad region, similarly to the opening 203 in FIGS. 4 and 5a, allows for the withdrawl of the food bags, or similar articles, through the surface of the counter and the narrow region, similarly to the longitudinal cuts 207, retains the next adjacent bag when the preceding bag is separated therefrom.

Figure 6:
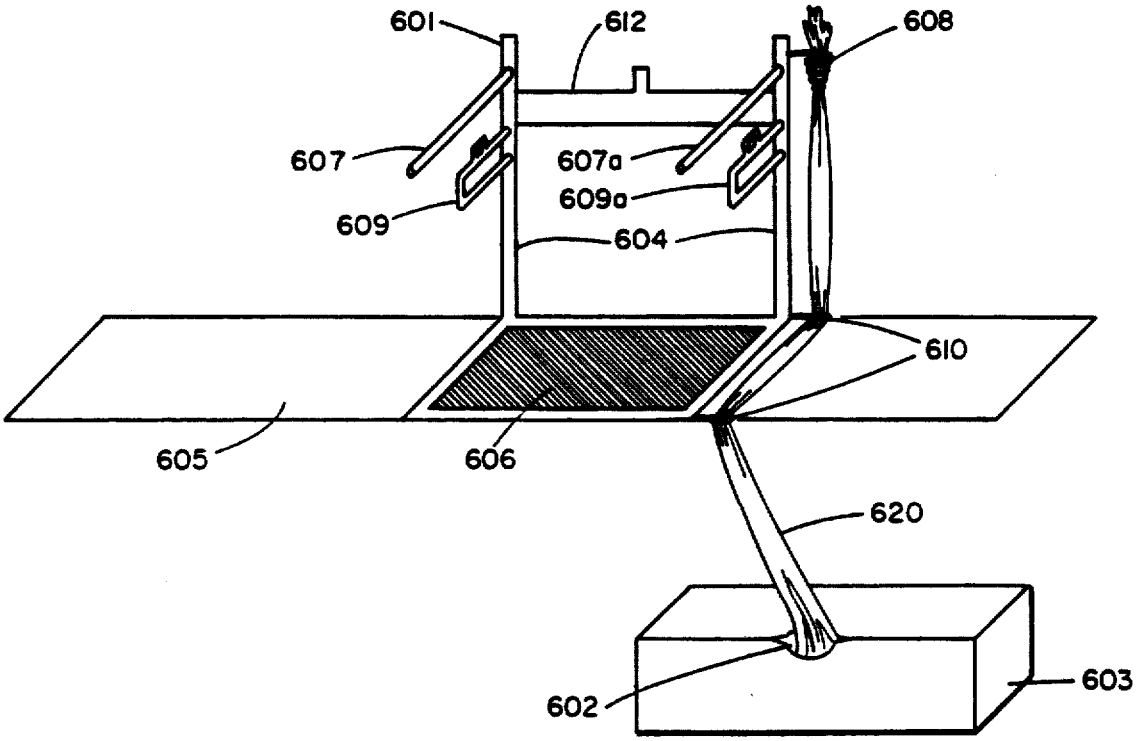
FIG. 6 illustrates yet another alternative embodiment of the invention, wherein it is used in conjunction with a rack system for supporting grocery sacks.

FIG. 6 illustrates an alternative embodiment of the invention wherein the dispensing system of the invention is used in conjunction with a rack system used at supermarkets to support plastic grocery sacks. The conventional rack system 601 comprises a bottom base member 606, two arms 604 extending perpendicularly from the base member, and two pairs of grocery sack supporting arms 607, 609 and 607a, 609a, extending perpendicularly from the two arms 604. A brace member 612 provides stability to the rack system. The rack system is placed on a table or a countertop 605. This conventional rack system is modified by incorporating into it the dispensing system of this invention, comprising a storage container 603 holding a package of centrally-dispensed gussetted food bags. The food bags are withdrawn from the container through an opening 602 and form a continuous, severable sheet material 620. The sheet material (comprised of individual bags, connected to each other) is threaded through eyelets 610 (a guiding means) to a dispensing means 608. The dispensing means 608 can be any one of the dispensing units described above in connection with the discussion of FIGS. 1, 2a, 2b, 4 or 5a–5h, e.g., dispensing units 8, 108 or 208, operated in the manner described above for the respective units. The incorporation of the dispensing system of this invention into the conventional grocery sack supporting rack system enhances the convenience of operation of the rack system because it gives check-out counter personnel instant access to the food bags at the same physical location at which the grocery sacks are supported by the rack system.

It will be apparent to those skilled in the art that the specific embodiments discussed above can be successfully repeated with ingredients equivalent to those generically or specifically set forth above and under variable process conditions.

From the foregoing specifications, one skilled in the art can readily ascertain the essential features of this invention and without departing from the spirit and scope thereof can adapt it to various diverse applications.

I claim:

1. A dispensing system for a package of a continuous, severable sheet material comprised of a plurality of individual severable plastic bags, said plastic bags being defined by transverse pre-weakened regions, said system comprising a substantially closed box containing at least one opening in one of the walls thereof, said box holding said package, and a dispensing means, said dispensing mean being fixedly attached to a surface located above said box and being physically separated from and placed at a location physically remote from said box, said dispensing means being capable of guiding said severable sheet material, said dispensing means having a sufficient rigidity to facilitate the separation of a first plastic bag and retain a second plastic bag, adjacent to the first plastic bag, within said dispensing means.

2. A dispensing system of claim 1 wherein said dispensing means is comprised of a base member, attached to said surface, and a dispensing member attached substantially perpendicularly to said base member.

3. A dispensing system of claim 2 wherein said dispensing member comprises an elongated support member having two ends, the first end being attached to said base member, and the second end being formed into a spiral.

4. A dispensing system of claim 3 wherein said base member and said support member are fabricated from aluminum, steel or copper wire rod.

5. A dispensing system of claim 4 wherein said base member has a circular shape 1 to 3 inches in diameter.

6. A dispensing system of claim 5 wherein said support member is a substantially elongated member 2 to 6 inches in length.

7. A dispensing system of claim 6 wherein said plastic bags are thermoplastic bags.

8. A dispensing system of claim 7 wherein said bags are connected in a top of one-to-bottom of consecutive bag relationship and they are severable at transverse perforations at the top of each bag.

9. A dispensing system of claim 1 wherein said dispensing means comprises a conically-shaped elongated member substantially spirally-wound throughout its length.

10. A dispensing system of claim 9 wherein the base of said conically-shaped elongated member has the diameter of about 1 to about 3 inches.

11. A dispensing system of claim 10 wherein said conically-shaped member has the height of about 2½ to about 5½ inches.

12. A dispensing system of claim 11 wherein said bags are connected in a top of one-to-bottom of consecutive bag relationship and they are severable at transverse perforations at the top of each bag.

13. A dispensing system of claim 12 wherein said surface is a supertmarket check-out counter and said thermoplastic bags are "wet bags".

14. A dispensing system of claim 12 wherein said surface is a rack system for supporting grocery sacks and said thermoplastic bags are "wet bags".

15. A dispensing system of claim 1 wherein said dispensing means comprises a relatively wide opening for guiding said severable sheet material and at least one relatively narrow region for retaining said severable sheet material.

16. A dispensing system of claim 15 wherein said dispensing means is manufactured from ⅜ inch thick polyurethane sheet.

17. A dispensing system of claim 16 wherein said relatively wide opening is located substantially in the center of said dispensing means.

18. A dispensing system of claim 17 wherein said at least one relatively narrow region comprises a plurality of slits extending radially from said wide opening towards the periphery of said dispensing means.

19. A dispensing system of claim 18 wherein said plastic bags are thermoplastic bags.

20. A dispensing system of claim 19 wherein said surface is a supermaket check-out counter and said thermoplastic bags are "wet bags".

21. A dispensing system claim 18 wherein said surface is a rack system for supporting grocery sacks and said thermoplastic bags are "wet bags".

22. A method of dispensing a continuous severable sheet material comprised of a plurality of individual severable plastic bags, said plastic bags defined by transverse pre-wealened regions, comprising storing a package of said continuous severable sheet material in a storage container containing at least one opening;

conducting said continuous severable sheet material through said opening;

engaging said continuous severable sheet material with a dispensing means, said dispensing means being located physically separately from and at a location physically remote from said storage container means;

passing said continuous severable sheet material into the entrance of said dispensing means at least until one of said transverse pre-weakened regions passes substantially completely through said dispensing means and passes the exit thereof; and applying a sufficient force to said continuous severable sheet material, in direction substantially transverse to the direction of the passage of said continuous severable sheet material, to separate at least one of said plastic bags from the consecutive plastic bag at the point of said transverse pre-weakened regions.

23. A method of claim 22 wherein said individual severable plastic bags are thermoplastic bags.

24. A method of claim 23 wherein said bags are connected in a top of one-to-bottom of consecutive bag relationship and they are severable at transverse peforations at the top of each bag.

25. A method of claim 24 wherein said dispensing means has a sufficient rigidity to facilitate the separation of a first plastic bag and retain a second plastic bag, adjacent to the first plastic bag, within said dispensing means.

*26. A dispensing system for a package of severable sheet material comprising a plurality of individually severable plastic bags, said plastic bags being defined by transverse pre-weakened regions, said system comprising a check-out counter, storage means holding said package below the bottom of said counter, a dispensing unit mounted to said counter at a location remote from said storage means, said unit comprising a unitary structure having at least one relatively wide opening in communication with at least one relatively narrow region, said wide opening being capable of guiding said bags therethrough and said narrow region being capable of providing sufficient resistance to a force applied to any one of said severable bags to facilitate the separation of a first bag and to retain therein a next adjacent bag.*

*27. The system of claim 26 wherein said dispensing means is mounted into said counter.*

*28. In a plastic bag dispensing system at a check-out counter the improvement comprising, locating a storage means below the bottom of said counter, said storage means holding a package of a plurality of individually severable plastic bags, each bag defined by transverse pre-weakened regions, and locating a dispensing unit mounted to said counter remote from said storage means, said dispensing unit comprising a unitary structure having at least one relatively wide opening in communication with at least one relatively narrow region, said wide opening being capable of guiding said bags therethrough and said narrow region being capable of providing sufficient resistance to a force applied to any one of said severable bags to facilitate the separation of a first bag and to retain therein a next adjacent bag.*

*29. A method of dispensing plastic bags at a counter comprising: guiding, from below the bottom of said counter, plastic bags, from a package of a plurality of individually severable plastic bags, said package being held by a storage means, each bag defined by transverse pre-weakened regions, to a unitary dispensing unit mounted to said counter and locate remote from said storage means, said dispensing unit being capable of guiding said severable*

*bags through at least one relatively wide opening therein and, by means of at least one relatively narrow region in communication with said wide opening, providing sufficient resistance to a force applied to any one of the severable bags, to facilitate separation of a first bag from said severable bags while retaining a next adjacent bag within said narrow region.*

*30. The method of claim 29 wherein said dispensing means is mounted into said counter.*

* * * * *